(12) United States Patent
Tsukahara et al.

(10) Patent No.: US 7,112,746 B2
(45) Date of Patent: Sep. 26, 2006

(54) DATA TRANSMISSION CABLE

(75) Inventors: Nobuhiko Tsukahara, Kanagawa (JP);
Yoichi Toriumi, Tokyo (JP); Kenji Shintani, Kanagawa (JP); Hirofumi Hashimoto, Tochigi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/531,666

(22) PCT Filed: Oct. 8, 2003

(86) PCT No.: PCT/JP03/12878

§ 371 (c)(1),
(2), (4) Date: Apr. 15, 2005

(87) PCT Pub. No.: WO2004/038734

PCT Pub. Date: May 6, 2004

(65) Prior Publication Data
US 2006/0042819 A1 Mar. 2, 2006

(30) Foreign Application Priority Data

Oct. 23, 2002 (JP) ............................. 2002-308924
Apr. 28, 2003 (JP) ............................. 2003-123547

(51) Int. Cl.
H01B 7/08 (2006.01)

(52) U.S. Cl. .................................. 174/117 F

(58) Field of Classification Search ................ 174/115, 174/117 F
See application file for complete search history.

(56) References Cited

U.S. PATENT DOCUMENTS

| 3,168,617 | A | * | 2/1965 | Richter | .................. | 174/117 FF |
| 3,408,453 | A | * | 10/1968 | Shelton, Jr. | .................. | 174/258 |
| 3,524,921 | A | * | 8/1970 | Wolf | .................. | 174/70 C |
| 4,251,712 | A | * | 2/1981 | Parr | .................. | 219/203 |
| 4,460,804 | A | * | 7/1984 | Svejkovsky | ............. | 174/117 A |
| 4,616,717 | A | * | 10/1986 | Luetzow | .................. | 174/117 F |
| 4,626,298 | A | * | 12/1986 | Allard | .................. | 156/55 |
| 2003/0178221 | A1 | * | 9/2003 | Chiu et al. | ............... | 174/117 F |

FOREIGN PATENT DOCUMENTS

| JP | 49-29476 | 3/1974 |
| JP | 55-132259 | 10/1980 |
| JP | 56-64610 | 5/1981 |
| JP | 58-99714 | 7/1983 |
| JP | 60-184205 | 12/1985 |
| JP | 62-131308 | 8/1987 |

(Continued)

Primary Examiner—Chau N. Nguyen
(74) Attorney, Agent, or Firm—Sonnenschein Nath & Rosenthal LLP

(57) ABSTRACT

There is provided a cable for data transmission which can be wired and constructed without damaging a surface of a wall, ceiling, floor or the like, without using any clamps and which does not degrade appearance of a wired space, and further, allows the wiring construction of the cable provided with a plurality of core wires in a state of less crosstalk. A cable (1) for data transmission includes a core wire (2) having a medium that transmits data and a coating member (4) having adhesiveness and coating at least part of the core wire (2). In this way, because of the adhesiveness of the coating member (4), it is easy to stick the cable onto a wall (6) or the like. Moreover, since a wiring construction of the cable on a surface of the wall (6) or the like without using a clamp, screw or nail is made possible, only the cable is exposed on the surface of the wall (6) or the like and the appearance thereof is improved.

2 Claims, 8 Drawing Sheets

FOREIGN PATENT DOCUMENTS

| | | |
|---|---|---|
| JP | 63-87724 | 6/1988 |
| JP | 63-108112 | 7/1988 |
| JP | 01-213912 | 8/1989 |
| JP | 04-6127 | 1/1992 |
| JP | 2000-106039 | 4/2000 |
| JP | 2001-312923 | 11/2001 |

* cited by examiner

DATA TRANSMISSION CABLE

The present invention relates to a cable for data transmission, such as an optical fiber cable and an electric cable.

In the past, in a case where a wire medium such as an optical fiber cable and an electric cable is wired and constructed in a wall, ceiling, floor or the like of a housing, for example, clamps have been arranged at constant intervals along a longitudinal direction of the cable to fix the cable.

However, since the fixation of the cable with such fittings or the like requires a number of fittings, it is difficult to conceal all the fittings and the cable sags between the fittings owing to its own weight, which degrades the appearance.

Furthermore, in a rented house, the use of a screw or a nail is often prohibited and thus, as a matter of fact, the cable cannot be wired and constructed on a surface of a wall, ceiling, floor or the like.

In order to solve such a problem, for example, in a case where a cable is extended along a wall of a housing or the like, the cable is made to adhere to the wall or the like by sticking a both-sided sticky tape on the wall or the like (for example, refer to Japanese Published Unexamined Application No. 11-353954 (paragraph 1, FIG. 1). In this document, a cable is extended along a window frame).

However, in such a technique, since the both-sided sticky tape is stuck to the wall or the like and the cable is further stuck on the both-sided sticky tape, the working is duplicated. As the working in a case where the both-sided sticky tape is stuck, the cable needs to be stuck along a portion where the tape is stuck. In this case, for example, when a location where the tape is stuck is wrong, the tape is detached and the working needs to be carried out again, which is troublesome.

Furthermore, on the other hand, among the cables, there is a so-called multi-conductor cable in which a plurality of core wires (so-called insulated conductors (in each of which a bare conductor wire is coated with an insulating body)) are provided in an outer coating layer. The cable of this structure also has a problem that since the core wires are normally included in the coating layer in contact with each other, crosstalk between the core wires is significant, thereby leading to deterioration of a signal in quality.

In light of the above-described situation, it is an object of the present invention to provide a cable for data transmission which can be wired and constructed without damaging a surface of a wall, ceiling, floor or the like, without using any clamps and which does not degrade appearance of a wired space. In addition, it is another object of the present invention to provide a cable for data transmission in which the cable provided with a plurality of core wires can be wired and constructed in a state of less crosstalk.

SUMMARY OF THE INVENTION

In order to achieve the above-mentioned object, a cable for data transmission according to a first aspect of the present invention comprises a core wire having a medium that transmits data, and a coating member having stickiness, which covers at least part of the core wire.

The medium that transmits data is, in a case where the cable of the present invention is an optical fiber cable, for example, an optical waveguide composed of a core and a cladding layer, and in a case where the cable is an electric cable, the medium is a conductor wire. The core wire is, in the case where the cable of the present invention is an optical fiber cable, for example, an optical fiber including an optical waveguide composed of a core and a cladding layer, and a buffer layer, and in the case where the cable is an electric cable, the core wire is a so-called insulated conductor wire (conductor wire in a state coated with an insulating body).

Furthermore, the aforementioned "electric cable" denotes a concept including all cables containing a conductive wire such as a twisted pair cable used in a general telephone wire, a LAN (Local Area Network) cable or the like.

In the present invention, since the coating member is provided with stickiness, the cable can be easily attached to a wall, ceiling, floor or the like. Furthermore, since the wiring and construction of the cable on a surface of the wall, ceiling, floor or the like is enabled without using any clamp, screw and nail, only the cable is exposed on the surface of the wall or the like, which improves the appearance. Furthermore, since the cable itself has adhesiveness, a position of the clamp does not need to be considered and the cable can be wired and constructed at a free position on the surface of the wall or the like.

In one embodiment of the present invention, the aforementioned coating member has a flat surface portion formed by making part of a surface thereof into an almost flat surface. By sticking this flat surface on the surface of the wall or the like to face thereto, an adhesion area is increased, which improves the adhesiveness.

In one embodiment of the present invention, there is further provided a separating member which can be stuck to the flat surface portion and be released from the coating member. Thereby, at the time of wiring and construction, by only peeling off the separating member, the cable can adhere to the surface of the wall, ceiling, floor or the like and thus none of a clamp, screw, nail and tool is necessary.

In one embodiment of the present invention, there is further provided a cover member covering a region other than the aforementioned flat surface portion in the surface of the aforementioned coating member. This can improve the handiness of the cable. More specifically, if the coating member remains bare, the cable sticks to a finger during wiring and construction or the cables adhere to each other. In order to prevent this, other than the part covered with the separating member is covered with the cover member to remove the stickiness of the surface of the cable.

In one embodiment of the present invention, the aforementioned cover member is made of a substantially transparent material. After the cable has been wired and constructed on the wall, ceiling, floor or the like whose color can be considered to be various, the cover member is assimilated to the color of the wall or the like, which can make the cable inconspicuous. Furthermore, if not only the cover member but also the coating member is made of a substantially transparent material, the color of the wall or the like can be seen as it is through the cover member and the coating member, so that the cable becomes less conspicuous than the cable colored in a particular color.

In one embodiment of the present invention, the aforementioned cover member has a light shielding property. In the present invention, in a case where the cable is particularly an optical fiber cable, deterioration of a signal in quality caused by an extraneous light mixing in the core wire from the outside of the cable can be prevented.

In one embodiment of the present invention, the aforementioned cover member has an electromagnetic shielding property. In the present invention, in a case where the cable is particularly a cable having a conductive wire (general electric cable), deterioration of a signal in quality caused by an electromagnetic wave mixing in the core wire from the outside of the cable can be prevented.

A cable for data transmission according to a second aspect of the present invention comprises a plurality of core wires provided at predetermined intervals, respectively and each having a medium that transmits data, and a coating member having stickiness which covers the aforementioned plurality of core wires. In the present invention, in a case where a so-called multi-conductor cable is wired and constructed, the cable can be easily stuck to a wall, ceiling, floor or the like and crosstalk between the respective core wires inside the cable can be reduced as much as possible. Concretely, by arranging wire medium core wires at a necessary distance from each other at predetermined intervals inside the coating member, the multi-conductors can be easily realized. Furthermore, by making the coating members multiple-stage, a larger number of core wires can be arranged.

A cable for data transmission according to a third aspect of the present invention comprises a core wire having a medium that transmits data, a coating member having stickiness which is provided around the aforementioned core wire, and an intervening member interposed between the aforementioned core wire and the aforementioned coating member.

For example, in a case where the cable for data transmission is connected to external equipment or two cables are connected to each other through an adapter, or the like, a connector needs to be attached to an end portion of the cable. In this case, for example, the core wire is exposed using a tool or the like and the connector is attached to the cable, centering on the exposed part. However, at this time, in the case where the intervening member of the present invention is not present, the coating member sticks to the core wire by the stickiness of the coating member, so that the core member may not be able to be exposed finely. Accordingly, in the present invention, the intervening member is interposed between the core wire and the coating member to thereby prevent the sticking between the core wire and the coating member. Thereby, in a case where the connector is attached to the end portion of the cable, for example, the coating member can be easily peeled off together with the intervening member, so that the core wire can be exposed. Furthermore, in the present invention, in a case where the connector is attached to the end portion of the cable, the intervening member does not need to be provided in the entire core wire. This is because during working for attaching the connector, the intervening member only needs to be provided so that at least the portion of the core wire to be exposed is covered. Accordingly, the intervening member may be provided in a predetermined length from the end portion of the cable or an end portion of the core wire. As a material of the intervening member, for example, silicone resin, polyethylene resin and the like can be exemplified.

DETAILED DESCRIPTION OF THE PRESENTLY PREFERRED EMBODIMENTS

Hereinafter, the preferred embodiments of the present invention are described on the basis of the drawings.

Figure 1:
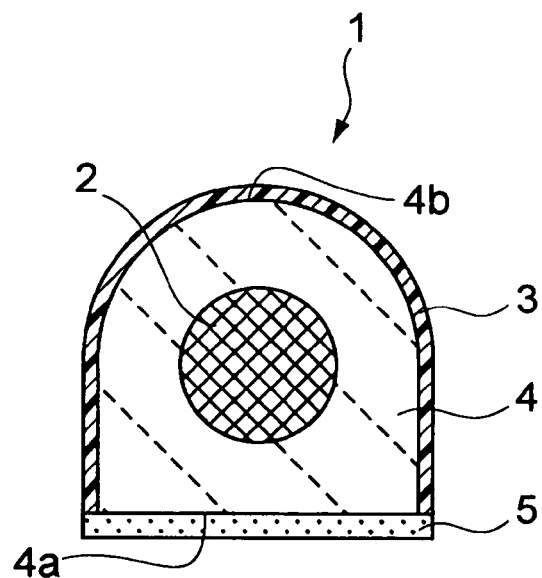
FIG. 1 is a cross-sectional view showing a cable for data transmission according to a first embodiment of the present invention.

FIG. 1 is a cross-sectional view showing a cable for data transmission according to a first embodiment of the present invention. This cable 1 is an optical fiber cable or a general electric cable, for example. In this cable 1, a core wire 2 is covered with a coating member 4 having stickiness and this coating member 4 is covered with a cover film 3 and a release paper 5. This coating member 4 has a flat surface portion 4a formed by making part of a surface of the coating member 4 into a flat surface and a curvature portion 4b including a portion formed into a curvature shape at a position opposed to the flat surface portion 4a.

The release paper 5 is stuck by stickiness of the coating member 4 to the flat surface portion 4a formed by making portion of the surface of the coating member 4 into a flat surface, and the cover film 3 is stuck to the curvature portion 4b. The cover film 3 may be stuck to the coating member 4 only by the stickiness of the coating member 4, or may be stuck by an adhesive agent or the like. For the coating member 4, sticky silicon, sticky rubber or the like can be used. Furthermore, the cover film 3 is made of a resin, for example.

In a case where the cable 1 is an optical fiber cable, for example, the core wire 2 is an optical fiber including an optical waveguide composed of a core and a cladding layer, and a buffer layer, and in a case where the cable 1 is an electric cable, the core wire 2 is a so-called insulated conductor wire (a conductor wire in a state covered with an insulating body).

Figure 2:
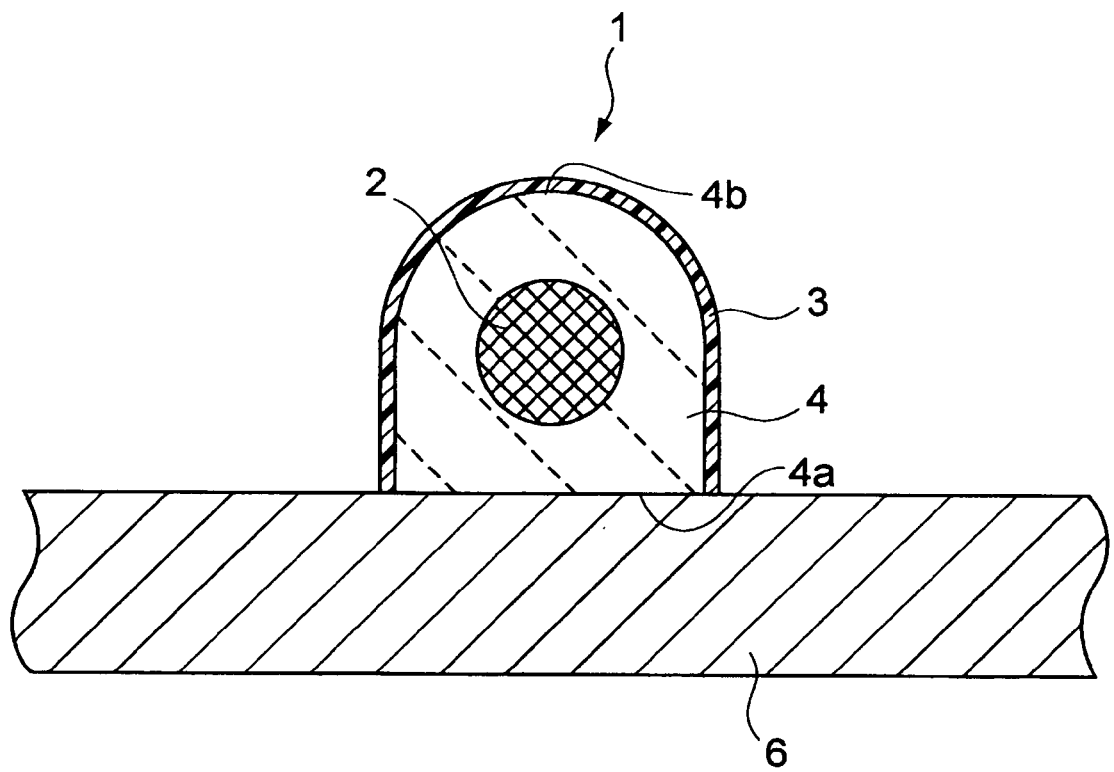
FIG. 2 is a cross-sectional view showing a state of the cable shown in FIG. 1, at the time of a wiring construction.

When the cable 1 having such a configuration is wired and constructed, the release paper 5 is peeled off from the coating member 4 to expose the flat surface portion 4a, so that the cable 1 can be stuck and fixed to a wall 6 or the like, as shown in FIG. 2. This is stuck through the flat surface portion 4a having stickiness.

Thus, in the present embodiment, provided with stickiness, the coating member 4 can be easily stuck to a wall, ceiling, floor or the like.

Figure 7A:
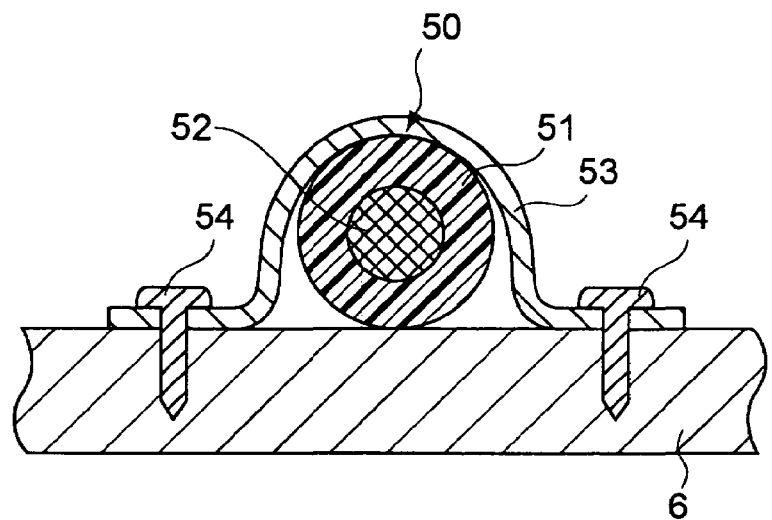
FIG. 7A to FIG. 7C are cross-sectional views each showing a state of a conventional cable after wiring construction.
Figure 7B:
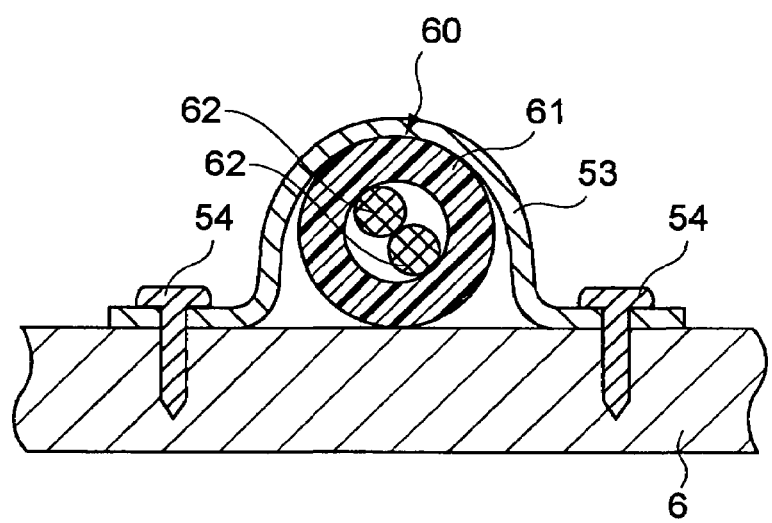
Figure 7C:
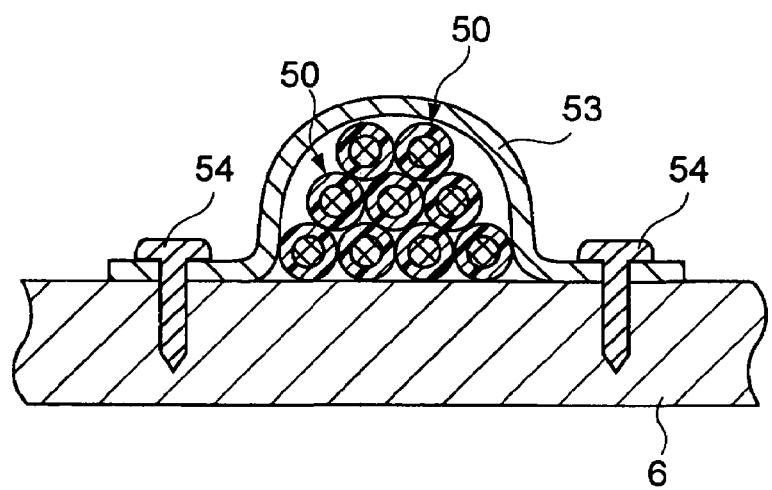

Here, FIGS. 7A to 7C are cross-sectional views each showing a state of wiring construction in which a conventional cable is wired by using a clamp. In FIG. 7A, a cable 50 having a core wire 52 is extended along the wall 6 or the like, the cable 50 is held down from above, for example, with a clamp 53 and the clamp 53 is fixed to the wall 6 or the like by screws or nails 54. In FIG. 7B, a cable 60 denotes a twisted pair cable composed by twisting core wires 62, for example. FIG. 7C shows a state in which a number of cables 50 shown in FIG. 7A are fixed in lump with the clamp 53.

In each of the construction states as shown in FIGS. 7A to 7C, since the cable is fixed by using the clamp, holes or the like are drilled in the wall 6. However, according to the present embodiment, the cable can be fixed without any clamp, screw, nail and the like, thereby avoiding such a problem. Furthermore, in the present embodiment, since no clamp, screw, nail or the like is used, only the cable 1 is exposed on the surface of the wall 6 or the like, which improves the appearance. Moreover, since the cable 1 itself has adhesiveness, the position of the clamp does not need to be considered and thus, the cable can be wired and constructed at a free position on the surface of the wall or the like.

Furthermore, in the present embodiment, working is not duplicated as compared with a case where the cable is stuck with a both-sided tape as conventional, so that the working is easily carried out. Moreover, in the case where the cable is stuck with the both-sided tape as conventional, if a width of the both-sided tape is larger than that of the cable, the cable lies off the both-sided tape when the cable is stuck, which degrades the appearance. However, according to the present embodiment, only the cable is exposed, which improves the appearance.

Furthermore, according to the present embodiment, since the flat surface portion 4a is formed in the coating member 4, an adhesion area is increased, so that the adhesiveness can be improved.

Moreover, in a case where the coating member 4 remains bare, the cable 1 adheres to a finger or the cables adhere to each other during wiring and construction. In contrast, according to the present embodiment, by covering with the cover film 3 other than the part covered with the release paper 5, the stickiness on the surface of the cable 1 is eliminated. In addition, the cover film 3 can secure strength of the cable 1.

Figure 3:
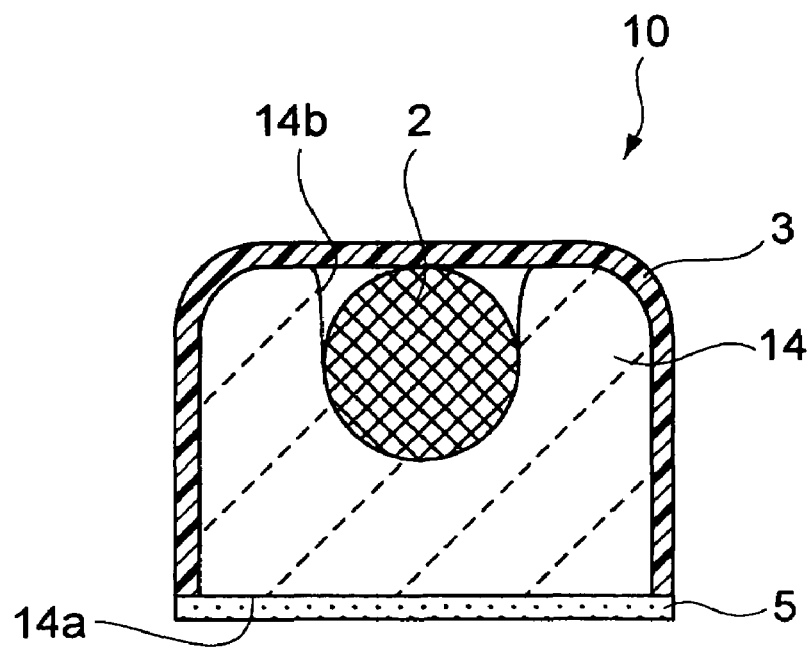
FIG. 3 is a cross-sectional view showing a cable according to a second embodiment of the present invention.

FIG. 3 is a cross-sectional view of a cable for data transmission according to a second embodiment of the present invention. In this cable 10, a coating member 14 having stickiness similar to the coating member 4 in the first embodiment has the core wire 2 fitted into a recessed portion 14b thereof. In the present embodiment, similarly, the release paper 5 is peeled off to stick the cable 10 to a wall or the like, so that the wiring construction can be easily carried out.

Figure 4:
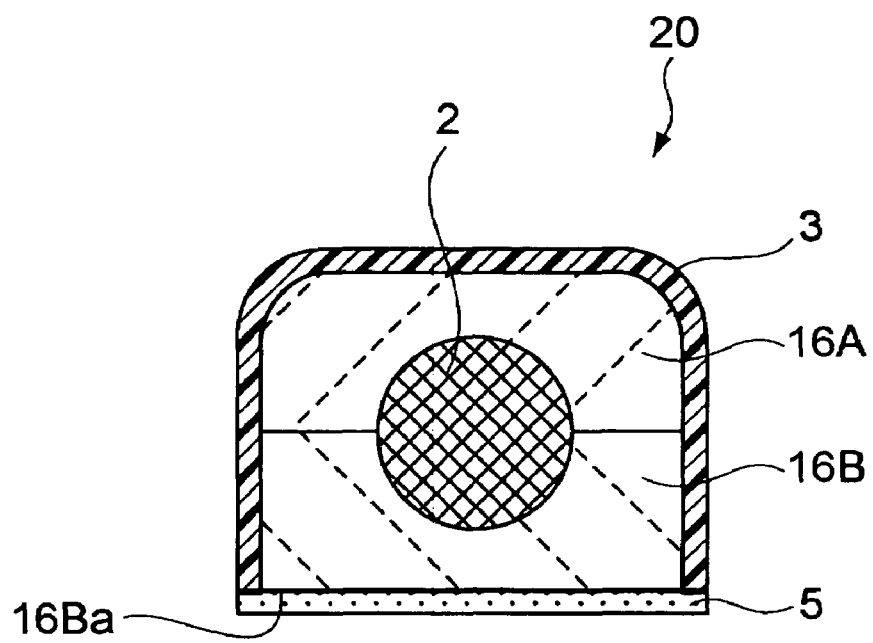
FIG. 4 is a cross-sectional view showing a cable according to a third embodiment of the present invention.

FIG. 4 is a cross-sectional view of a cable for data transmission according to a third embodiment of the present invention. In this cable 20, a coating member having stickiness is provided in such a manner that it is divided into two layers of an upper coating member 16A and a lower coating member 16B in the figure to sandwich the core wire 2. The release paper 5 is stuck to a flat surface portion 16Ba of the lower coating member 16B.

Figure 5:
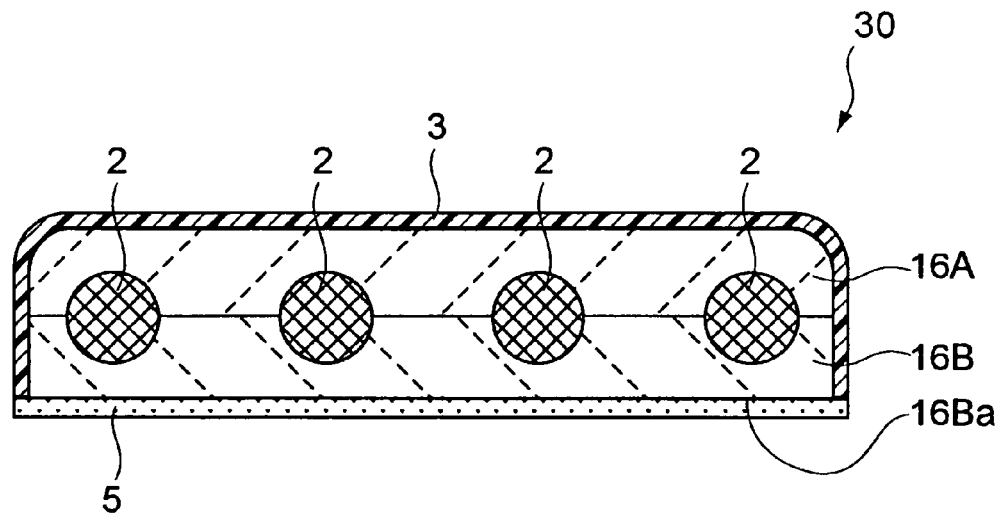
FIG. 5 is a cross-sectional view showing a multi-conductor cable according to an embodiment of the present invention.

FIG. 5 is a cross-sectional view of a cable for data transmission according to a fourth embodiment of the present invention, and this cable 30 is a so-called multi-conductor cable. In this embodiment, for example, four core wires 2 are sandwiched and fixed between the upper coating member 16A and lower coating member 16B both having stickiness. In the present embodiment, since the core wires are arranged apart from each other at predetermined intervals, crosstalk can be reduced, and thus deterioration of a signal in quality can be prevented.

Figure 6:
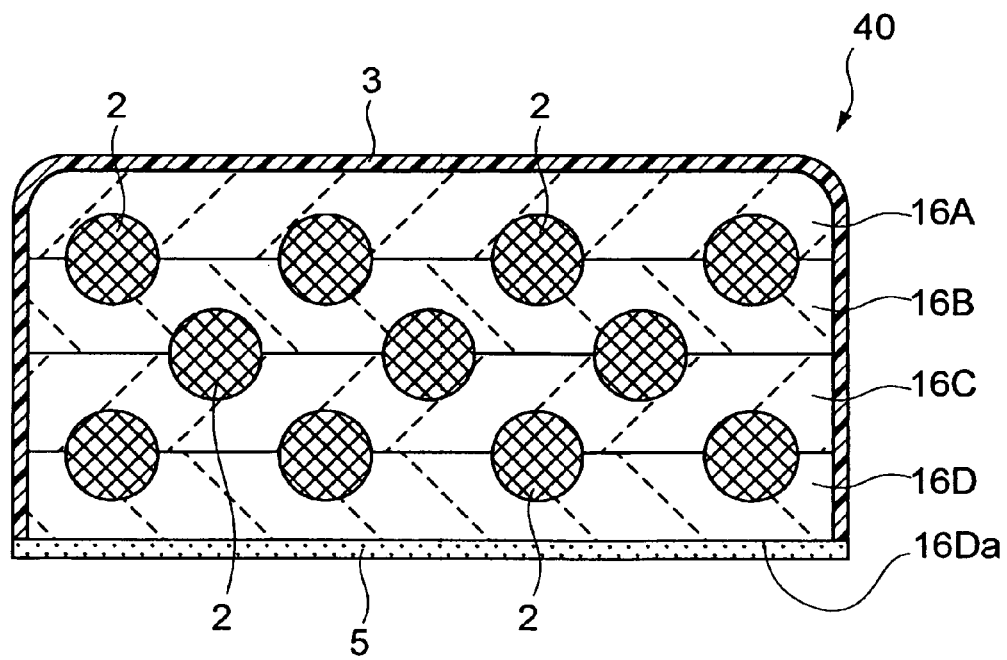
FIG. 6 is a cross-sectional view of the multi-conductor cable according to another embodiment.

FIG. 6 is a cross-sectional view of a cable for data transmission according to a fifth embodiment of the present invention, and this is a multi-conductor cable similar to the cable 30 in FIG. 5. According to the present embodiment, coating members 16A, 16B, 16C and 16D are multi-layered. For example, four core wires 2 are sandwiched between the coating members 16A and 16B and between the coating members 16C and 16D, respectively and for example, three core wires 2 are sandwiched and fixed between the coating members 16B and 16C. Thus, by multi-layering the coating members, the multi-conductors can be easily realized.

Figure 8A:
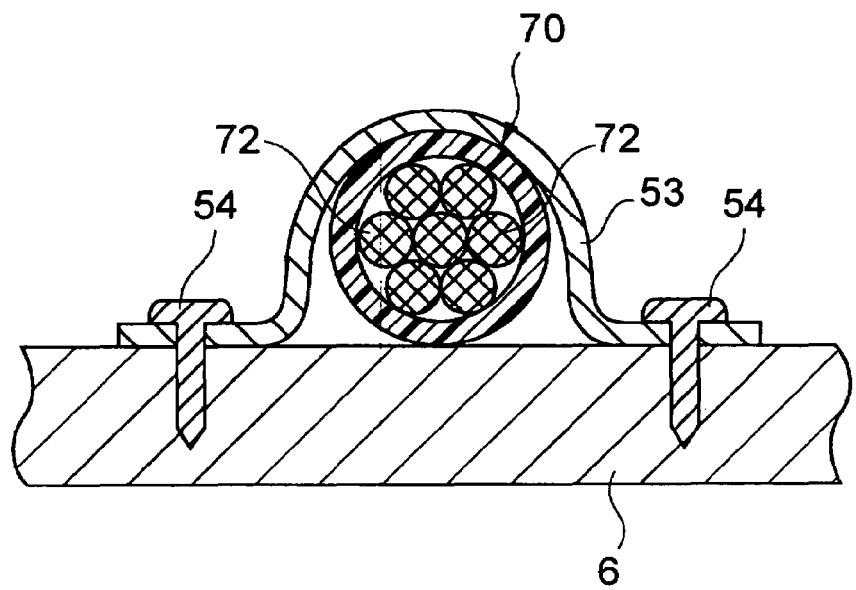
FIG. 8A to FIG. 8B are cross-sectional views each showing a state of a conventional multi-conductor cable after wiring construction.
Figure 8B:
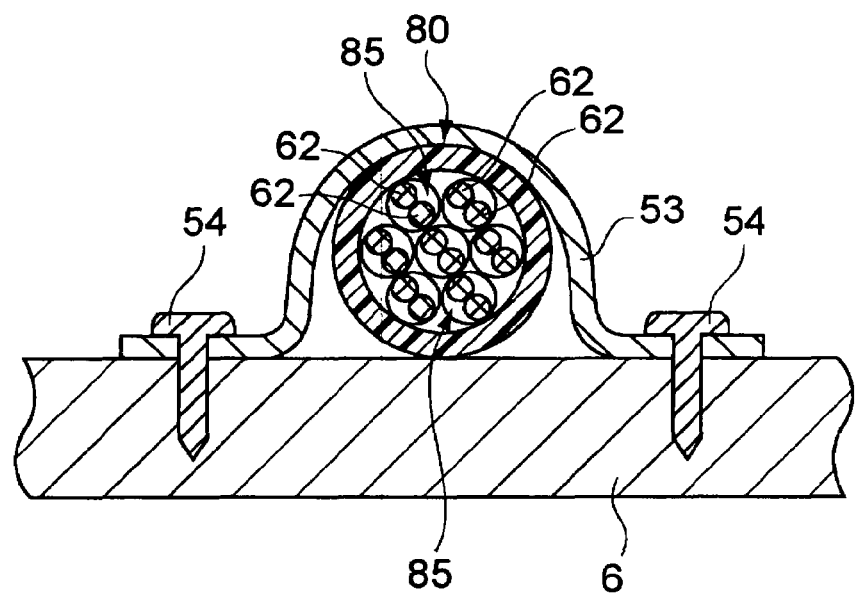

FIGS. 8A and 8B are cross-sectional views each showing a state in which the multi-conductor cable is conventionally fixed with a clamp. In FIG. 8A, a plurality of core wires 72 are adjacent to, or in contact with each other. Furthermore, in a cable 80 shown in FIG. 8B, similarly, twisted pair cables 85 are adjacent to, or in contact with each other. Thereby, in the conventional cables 70 and 80, crosstalk is increased and deterioration of a signal in quality is large, while by the cables 30 and 40 according to the present invention as shown in FIGS. 5 and 6, crosstalk can be reduced.

The present invention is not limited to the embodiments described above, but various modifications can be made. For sixth to tenth embodiments described later, similarly, modifications described below can be made.

For example, the cover film 3 and the coating members 4, 14 and 16 can also be transparent, substantially transparent, semitransparent or the like. Although transparent epoxy resin, transparent polystyrene and the like are exemplified as their material, the material is not limited to these. By making the material transparent, the cable can be assimilated to a color of the wall or the like and be made inconspicuous.

However, in the case where the cable is an optical fiber cable, the use of a cover film containing a pigment of black or the like, for example, allows the cable to have a light shielding property. This can prevent an extraneous light from mixing in the core wire 2, so that deterioration of a signal in quality can be prevented.

Furthermore, by providing the cover film with an electromagnetic shielding property, in the case the cable is particularly a cable having a conductive wire (general electric cable), deterioration of a signal in quality caused by an electromagnetic wave mixing in the core wire 2 from the outside of the cable can be prevented. In order to provide the electromagnetic shielding property, for example, the cover film 3 may be a conductive film or a conductive layer may be provided inside the cover film 3 made of resin.

Furthermore, although in the above-mentioned embodiments, the cables have a structure in which the entire coating members 4, 14 and 16 are provided with stickiness, the stickiness may be provided only to the lower surface portion, for example, to the vicinity of the flat surface portions 4a, 14a, 16Ba, 16Da. Alternatively, in FIGS. 4, 5 and 6, a structure in which the entire coating member 16B or 16D which is the lowest layer in the figure has stickiness may be employed.

Figure 9:
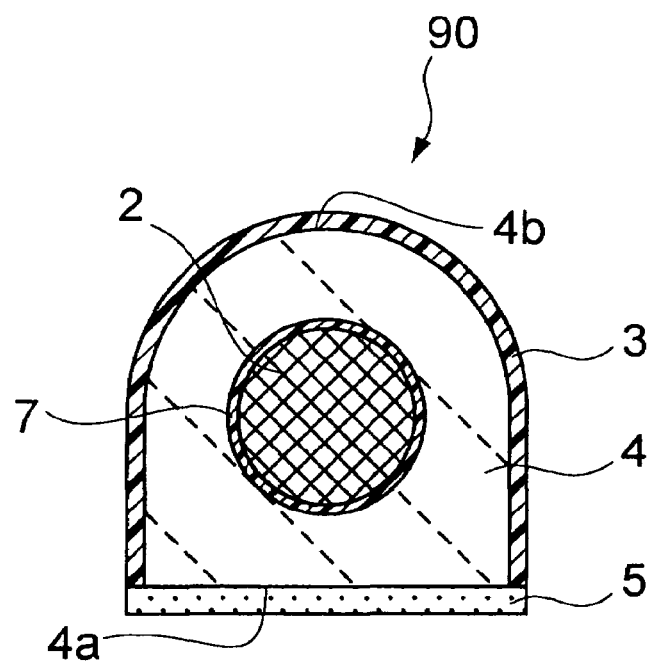
FIG. 9 is a cross-sectional view showing a cable according to a sixth embodiment of the present invention.

FIG. 9 is a cross-sectional view of a cable for data transmission according to a sixth embodiment of the present invention. This cable 90 has a structure in which an intervening member 7 is further provided in the cable 1 in the above-described first embodiment (refer to FIG. 1). As shown in FIG. 9, the intervening member 7 is interposed between the core wire 2 and the sticky coating member 4. In a case where this intervening member 7 is attached to the core wire 2, for example, the same means as in a coating of a general electric wire may be used.

As the intervening member 7, a member with lower stickiness or no stickiness is used. As a material of the intervenient member 7, for example, silicone resin, polyethylene resin and the like are exemplified, and in the other embodiments described later, the material is similar. A shape of the intervening member 7 is tubular.

Generally, for example, in such a case as where the cable 90 for data transmission is connected to external equipment, or where two cables are connected through an adapter, a connector not shown in the figure needs to be attached at an end portion of the cable 90. In this case, for example, the core wire 2 is exposed by a tool such as a wire stripper and the connector is attached to the cable 90, centering on the exposed part. In specific, for example, the exposed core wire 2 is connected to a ferrule provided in the connector to be held thereby and the connector is attached to the cable 90. However, during such working, in a case where the intervening member 7 is not present, the coating member 4 may stick to the core wire 2 by the stickiness of the coating member 4, so that the core wire 2 may not be able to be exposed finely. Accordingly, in the present embodiment, the intervening member 7 is interposed between the core wire 2 and the coating member 4 to prevent the sticking between the core wire 2 and the coating member 4. Thereby, for example, in a case where the connector not shown in the figure is attached to the end portion of the cable 90, the coating member 4 can be easily peeled off together with the intervening member 7 and the core wire 2 can be exposed finely.

Figure 10:
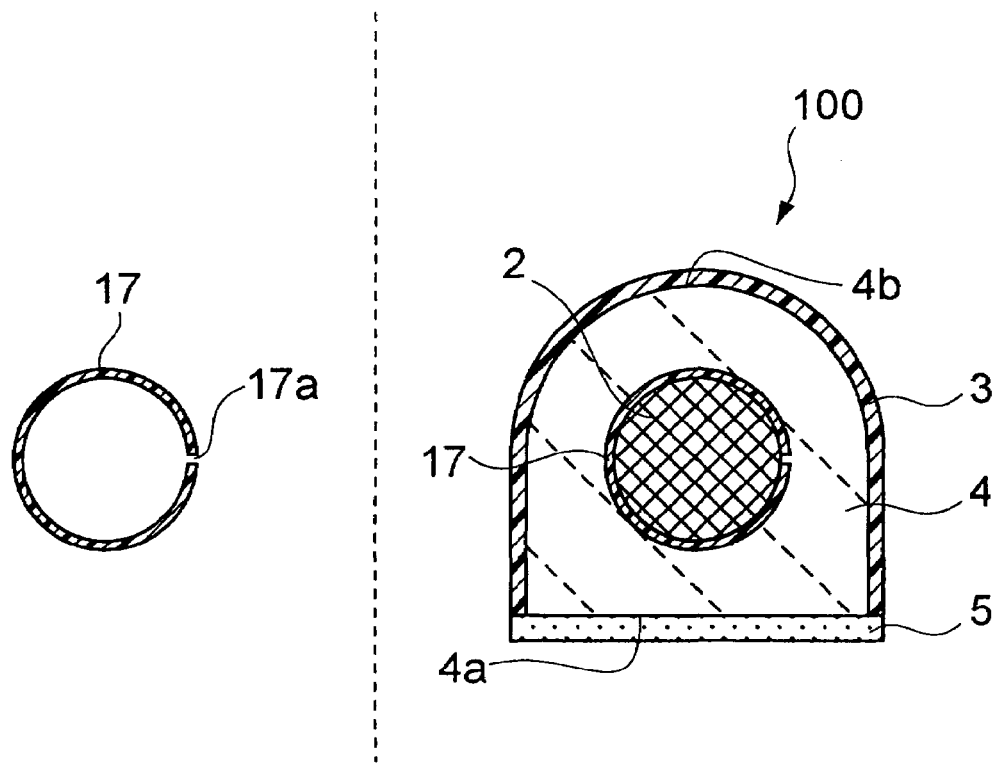
FIG. 10 is a cross-sectional view showing a cable according to a seventh embodiment of the present invention.

FIG. 10 is a cross-sectional view of a cable for data transmission according to a seventh embodiment of the present invention. In this cable 100, for example, the intervening member 17 is tubular with a substantially C-shaped cross section. The intervening member 17 is interposed between the core wire 2 and the coating member 4 in order to prevent the sticking therebetween. In a case where this intervening member 17 is attached to the core wire 2, for example, the intervening member 17 can coat the core wire 2 while opening the intervening member 17 from a slit portion 17a, that is, extending the intervening member 17. As a material or the like of the intervening member 17, one similar to that described in the above-mentioned sixth embodiment can be used.

According to the present embodiment, similarly, for example, when a connector not shown in the figure is attached to an end portion of the cable 100, the coating member 4 can be easily peeled off together with the intervening member 17, and thus the core wire 2 can be exposed finely.

Figure 11:
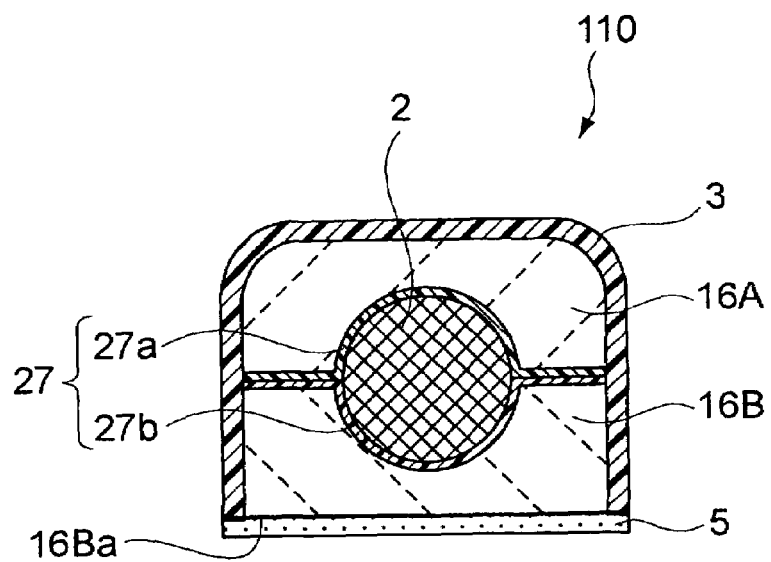
FIG. 11 is a cross-sectional view showing a cable according to an eighth embodiment of the present invention.

FIG. 11 is a cross-sectional view of a cable for data transmission according to an eighth embodiment of the present invention. This cable 110 has a configuration in which an intervening member 27 is further provided around the core wire 2 of the cable 20 in the third embodiment described above (refer to FIG. 4). The intervening member 27 is composed of a sheet member 27a provided on the lower surface side of the sticky coating member 16A and a sheet member 27b provided on the upper surface side of the sticky coating member 16B. As a material or the like of the intervening member 27, one similar to that described in the above-mentioned sixth embodiment can be used.

The present embodiment can also prevent the sticking between the core wire 2 and the coating members 16A and 16B. Thereby, for example, when a connector not shown in the figure is attached to an end portion of the cable 110, the coating members 16A and 16B can be easily peeled off together with the intervening member 27, and thus the core wire 2 can be exposed finely.

In an example shown in FIG. 11, the intervening member 27 may not be a sheet member but be a tubular member with a substantially circle cross section or be a tubular member with a C-shaped cross section.

Figure 12:
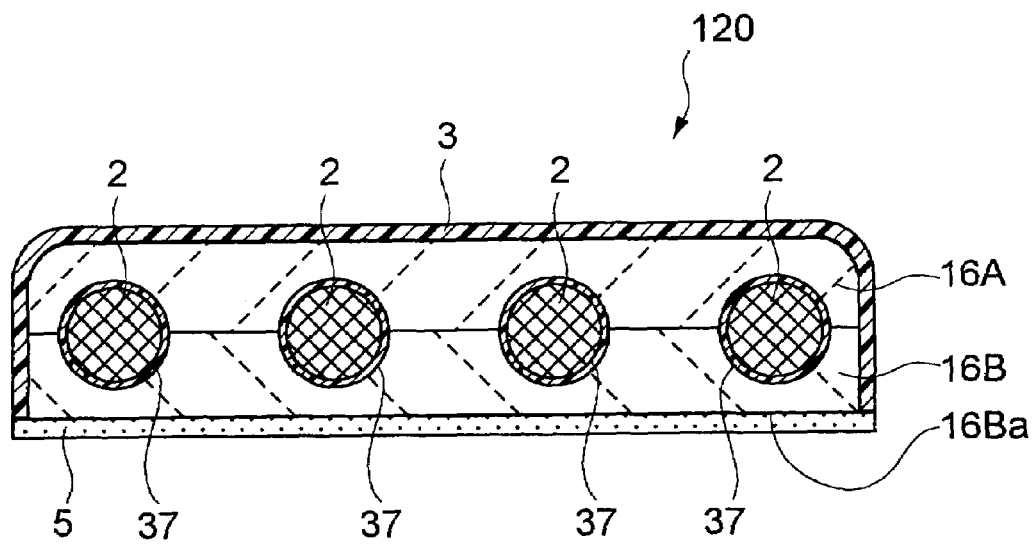
FIG. 12 is a cross-sectional view showing a cable according to a ninth embodiment of the present invention.

FIG. 12 is a cross-sectional view of a cable for data transmission according to a ninth embodiment of the present invention. This cable 120 has a structure in which intervening members 37 are further provided in the cable 30 in the fourth embodiment described above (refer to FIG. 5). The intervening members 37 are tubular members each with a substantially circle cross section and are provided in plural corresponding to a plurality of core wires 2, respectively. As a material or the like of the intervenient members 37, an equivalence to one described in the above-mentioned sixth embodiment can be used.

The present embodiment can also prevent the sticking between the core wire 2 and the coating members 16A and 16B. Thereby, for example, when a connector not shown in the figure is attached to an end portion of the cable 120, the coating members 16A and 16B can be easily peeled off together with the intervenient member 37, and thus the core wire 2 can be exposed finely.

In an example shown in FIG. 12, the intervening member 37 does not have a substantially circle cross section, but may be a tubular member with a substantially C-shaped cross section.

Figure 13:
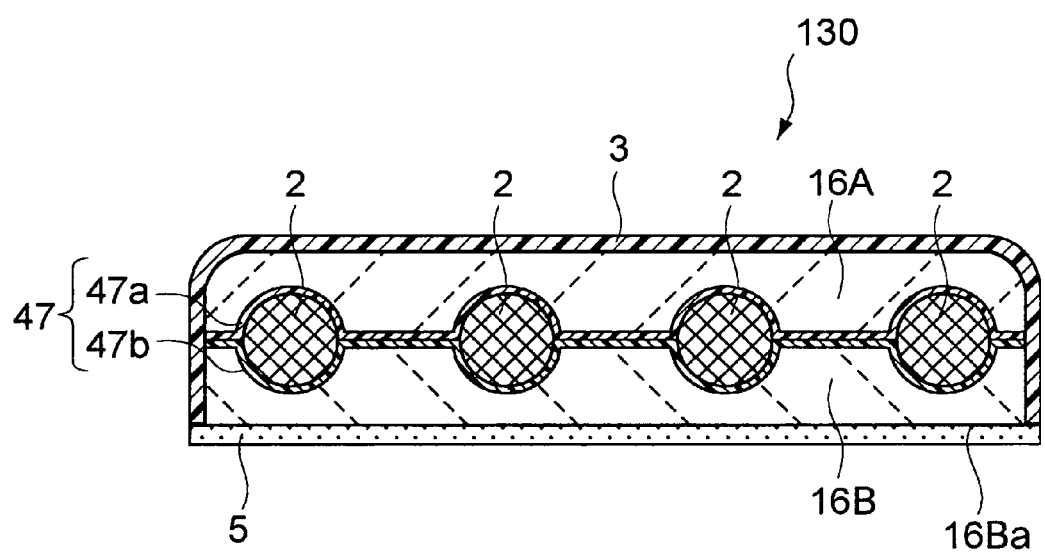
FIG. 13 is a cross-sectional view showing a cable according to a tenth embodiment of the present invention.

FIG. 13 is a cross-sectional view of a cable for data transmission according to a tenth embodiment of the present invention. In this cable 130, an intervening member 47 is composed of sheet members 47a and 47b in place of the intervening members 37 of the cable 120 shown in FIG. 12. The sheet member 47a is provided on the lower surface side of the sticky coating member 16A and the sheet member 47b is provided on the upper surface side of the sticky coating member 16B.

The present embodiment can also prevent the sticking between the core wire 2 and the coating members 16A and 16B. Thereby, for example, when a connector not shown in the figure is attached to an end portion of the cable 130, the coating members 16A and 16B can be easily peeled off together with the intervening member 47, and thus the core wire 2 can be exposed finely.

The present invention is not limited to the sixth to the tenth embodiments described above, but various modifications can be made.

For example, in the above-mentioned sixth embodiment, in a case where the connector is attached to the end portion of the cable 90, the intervening member 7 does not need to be provided in the entire core wire 2, that is, an entire length thereof. This is because during working for attaching the connector, the intervening member 7 only needs to be provided so as to cover at least the portion of the core wire 2 to be exposed. Accordingly, the intervening member 7 may be provided in a predetermined length from the end portion of the cable 90 or from an end portion of the core wire 2. In this case, for example, the intervening member 7 may be cut in the predetermined length to cover the predetermined portion of the core wire 2 to be exposed. The predetermined length necessary for attaching the connector is about 10 mm to 50 mm. This example is similar in the above-mentioned seventh to tenth embodiments.

Furthermore, for example, in the example shown in FIG. 6, it is obviously possible that the intervening members described in the sixth to tenth embodiments are each interposed between the core wire 2 and the coating members 16A to 16D.

As described above, according to the present invention, a cable provided with a plurality of core wires, which can be wired and constructed without damaging a wall, ceiling, floor or the like and without using any clamp or the like. It is also possible with the present invention that the wiring construction can be carried out without deteriorating appearance in a wired location and in a state of less crosstalk. Furthermore, the sticky coating member can be easily released from the core wire.

What is claimed is:

1. A cable for data transmission, characterized by including:
   a core wire having a medium that transmits data;
   a coating member which covers at least part of said core wire, said coating member having a flat surface portion formed substantially flat at part of a surface thereof and having stickiness and being divided into a plurality of layers and provided to have said core wire sandwiched between the divided layers respectively;
   a separating member stuck on said flat surface portion and being releasable from said coating member;
   a cover member which covers the surface of said coating member at an area other than said flat surface portion; and
   an intervening member disposed between said core wire and said coating member, said intervening member being substantially tubular in shape and made of two sections, each of which is C-shaped in cross section.

2. A cable for data transmission, characterized by including:
   a plurality of core wires each having a medium that transmits data, disposed at predetermined intervals, respectively;
   a coating member which covers at least part of each of said plurality of core wires, said coating member having a flat surface portion formed substantially flat at part of a surface thereof and having stickiness;
   a separating member stuck on said flat surface portion and being releasable from said coating member;
   a cover member which covers the surface of said coating member at an area other than said flat surface portion; and
   an intervening member disposed between said core wire and said coating member,
   wherein,
   said coating member is divided into a plurality of layers and provided to have said core wire and said intervening member sandwiched between the divided layers respectively,
   said intervening member is made of sheet-like members, and
   said plurality of core wires are sandwiched from top and bottom with an upper one of said sheet-like members and a lower one thereof and further sandwiched by said divided coating member.

* * * * *